UNITED STATES PATENT OFFICE.

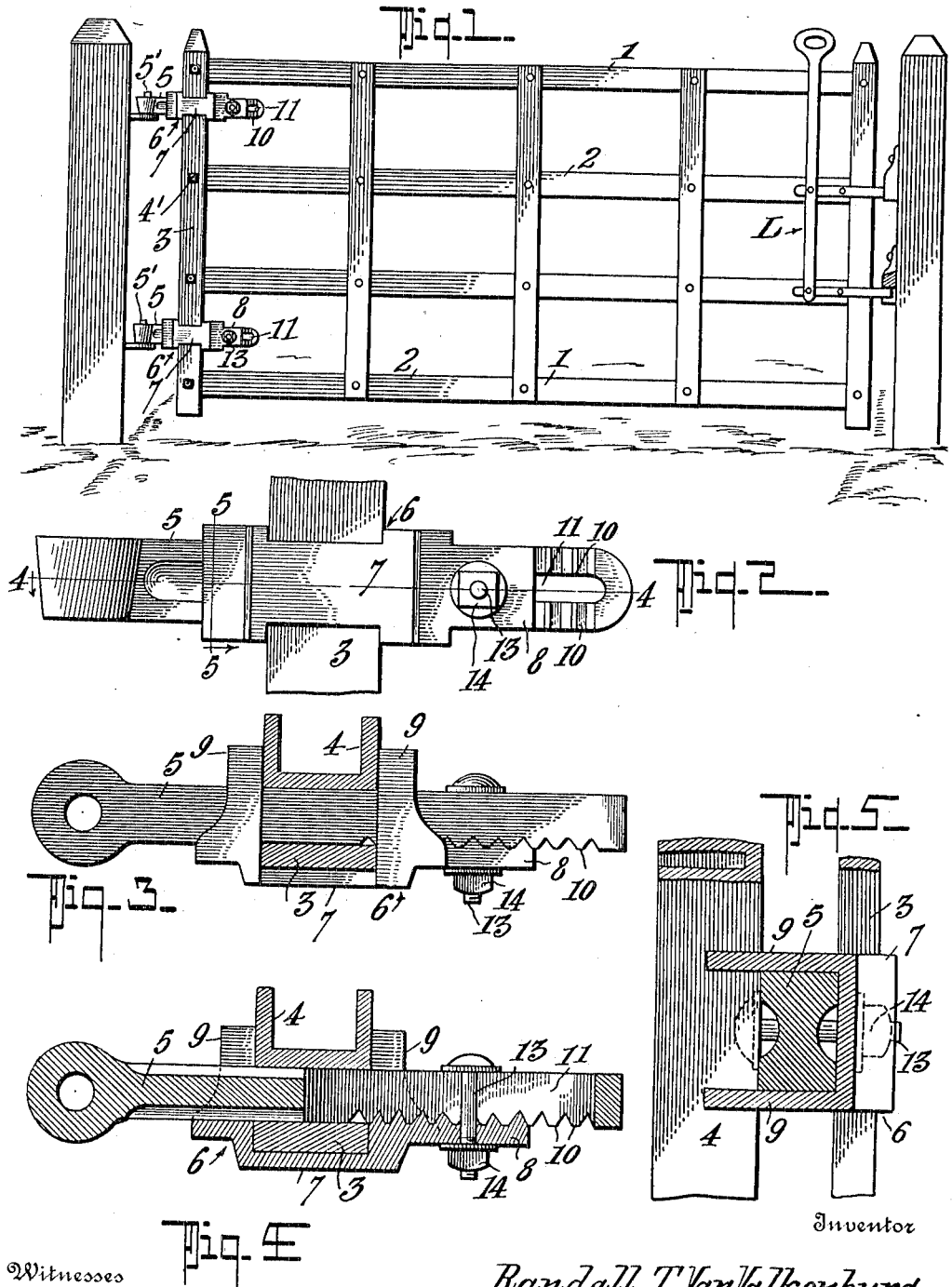

RANDALL T. VAN VALKENBURG, OF WASHINGTON, DISTRICT OF COLUMBIA.

GATE-HINGE.

1,084,832.  Specification of Letters Patent.  Patented Jan. 20, 1914.

Application filed November 3, 1913. Serial No. 798,969.

*To all whom it may concern:*

Be it known that I, RANDALL T. VAN VALKENBURG, citizen of the United States, residing at Washington, in the District of Columbia, have invented certain new and useful Improvements in Gate-Hinges; and I do declare the following to be a full, clear, and exact description of the invention, such as will enable others skilled in the art to which it appertains to make and use the same.

This invention relates to hinges, and more particularly to those applicable to farm gates and having means for varying the distance between the gate post and the gate.

The main object of the invention is to improve the construction of hinges of this character to such an extent as to render the gate longitudinally adjustable and to provide means for preventing the hinged end of the gate from sagging.

With this and other objects in view the invention resides in certain novel features of construction and combination herein described and claimed and shown in the drawings wherein—

Figure 1 is a side elevation of a gate equipped with my improved hinge. Fig. 2 is an enlarged side elevation of one hinge member. Fig. 3 is a plan view thereof. Fig. 4 is a horizontal sectional view on line 4—4 of Fig. 2; and Fig. 5 is a transverse sectional view on line 5—5 of Fig. 2.

In the drawings I have shown a gate 1 of suitable construction, but preferably having longitudinal bars 2, a flat end bar 3, and a channel end bar 4, the ends of the longitudinal bars 2 being secured between the two end bars by bolts 4'. I have shown a latch L on the opposite end of the gate but it forms no part of the present invention and need not be described in detail.

Coming now to the details of the present invention, the numeral 5 designates a hinge bar pivoted on suitable pins 5', and projecting forwardly between the bars 3 and 4 and secured to the bar 3 by a clamp 6. The clamp 6 comprises a shouldered plate 7 having a longitudinal extension 8 and a plurality of lateral bracing fingers 9. These fingers 9 are adapted to straddle the end bars 3 and 4 and the hinge bar 5 thus bracing said end bars and preventing the same from sagging. In order that I may adjust the hinge longitudinally I provide the bar 5 with teeth 10 and a longitudinal slot 11 and the extension 8 with teeth 12, adapted to intermesh with the teeth 10. A clamping bolt 13 is then passed through the slot 11 and an aperture in the extension 8 and receives a nut 14. By the use of this clamp alone, the gate will be securely fastened, but I prefer to then tighten the nuts on the bolts 4' and thus frictionally engage the inner side of the bar 3 with the adjacent side of the bar 5.

Various changes in the form proportion and minor details may be resorted to without departing from the scope of the invention as claimed.

What is claimed as new is:

1. The combination with a gate and a fixed pivot; of a hinge comprising: a hinge bar pivotally mounted on said pivot, a clamp having lateral fingers adapted to straddle said hinge bar and the end bar of said gate, and a bolt for drawing said hinge bar and said clamp into frictional contact with the opposite sides of said gate bar.

2. The combination with a gate having spaced vertical end bars, bolts connecting said bars to the gate proper, and a pivot; of a hinge comprising a slotted rack bar pivotally mounted on said pivot and projecting longitudinally between said vertical end bars, a clamp comprising a plate serrated on a portion of one side for engagement with the teeth on said rack bar, lateral bracing fingers carried by said plate and adapted to straddle said gate bars and said slotted rack bar, and a clamping bolt passing through said plate and the slot in said rack bar and adapted to draw the clamping plate and the rack bar into engagement with opposite sides of one of said gate bars, the other gate bar being adapted to be frictionally engaged with the opposite side of said rack bar by tightening the bolts connecting the end bars.

In testimony whereof I have hereunto set my hand in presence of two subscribing witnesses.

RANDALL T. VAN VALKENBURG.

Witnesses:
GEO. W. CAMPBELL,
CLIFFORD McGINNIS.

Copies of this patent may be obtained for five cents each, by addressing the "Commissioner of Patents, Washington, D. C."